(12) United States Patent
Lich et al.

(10) Patent No.: US 9,085,286 B2
(45) Date of Patent: Jul. 21, 2015

(54) TRIGGERING METHOD FOR ACTIVATING A LATERAL VELOCITY ESTIMATING SYSTEM FOR OCCUPANT PROTECTION DEVICES

(75) Inventors: Thomas Lich, Schwaikheim (DE); Michael Schmid, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1916 days.

(21) Appl. No.: 11/795,750

(22) PCT Filed: Dec. 21, 2005

(86) PCT No.: PCT/EP2005/057060

§ 371 (c)(1),
(2), (4) Date: Oct. 30, 2009

(87) PCT Pub. No.: WO2006/081902

PCT Pub. Date: Aug. 10, 2006

(65) Prior Publication Data

US 2010/0042294 A1    Feb. 18, 2010

(30) Foreign Application Priority Data

Feb. 3, 2005    (DE) .......................... 10 2005 004 894

(51) Int. Cl.
*A01B 69/06*    (2006.01)
*B62D 6/00*    (2006.01)
*B60T 8/172*    (2006.01)
*B60R 21/0132*    (2006.01)
*B60W 30/04*    (2006.01)
*B60R 21/013*    (2006.01)

(52) U.S. Cl.
CPC ............. *B60T 8/172* (2013.01); *B60R 21/0132* (2013.01); *B60W 30/04* (2013.01); *B60R 2021/01304* (2013.01); *B60R 2021/01313* (2013.01); *B60R 2021/01327* (2013.01); *B60T 2230/02* (2013.01); *B60W 2520/12* (2013.01)

(58) Field of Classification Search
CPC ....... B62D 6/003; B62D 7/159; B62D 8/1755
USPC ........... 701/41, 65, 70–74, 80, 82; 280/1.202, 280/5.51; 180/204, 6.2, 6.24, 9.38
See application file for complete search history.

(56) References Cited

U.S. PATENT DOCUMENTS 5,388,658 A *   2/1995   Ando et al. ................... 180/197
5,742,917 A *   4/1998   Matsuno ......................... 701/69
6,449,542 B1 *  9/2002   Bottiger et al. ................. 701/41

(Continued)

FOREIGN PATENT DOCUMENTS

DE    199 35 805    2/2000

OTHER PUBLICATIONS

Renfroe et al., "Quantitive Measure of Transient Oversteer of Road Vehicles", Engineering Institute, LLC., United States, Paper No. 07-0217, undated.*

*Primary Examiner* — Mary Cheung
(74) *Attorney, Agent, or Firm* — Kenyon & Kenyon LLP

(57) ABSTRACT

In a triggering method for activating a lateral velocity estimating system for occupant protection devices, one or more vehicle-dynamics variables are sensed and evaluated. Based on the sensed vehicle-dynamics variables an oversteer and understeer detection procedure and a road condition detection procedure are performed, which are evaluated for activation of the lateral velocity estimating system.

15 Claims, 3 Drawing Sheets

(56) References Cited

U.S. PATENT DOCUMENTS

| | | | |
|---|---|---|---|
| 6,615,124 B1* | 9/2003 | Adachi | 701/70 |
| 2003/0062768 A1* | 4/2003 | Loudon et al. | 303/146 |
| 2003/0229438 A1 | 12/2003 | Hac | |
| 2004/0074693 A1* | 4/2004 | Mattson et al. | 180/446 |
| 2004/0117088 A1* | 6/2004 | Dilger | 701/41 |
| 2004/0267428 A1* | 12/2004 | Knoop et al. | 701/70 |
| 2005/0125208 A1* | 6/2005 | Boyd et al. | 703/8 |
| 2007/0067085 A1* | 3/2007 | Lu et al. | 701/70 |
| 2008/0059034 A1* | 3/2008 | Lu | 701/71 |
| 2008/0082246 A1* | 4/2008 | Brown et al. | 701/91 |
| 2011/0066325 A1* | 3/2011 | Lu et al. | 701/37 |

* cited by examiner

TRIGGERING METHOD FOR ACTIVATING A LATERAL VELOCITY ESTIMATING SYSTEM FOR OCCUPANT PROTECTION DEVICES

BACKGROUND OF THE INVENTION

1. Field of the Invention

The present invention relates to a triggering method for activating a lateral velocity estimating system for occupant protection devices.

2. Description of Related Art

Data from the United States confirm the importance of passive safety in vehicle rollovers. In 1998, half of all fatal single-vehicle accidents were attributable to a rollover. Vehicle rollovers constitute approximately 20 percent of all accident events.

Conventional systems for rollover detection consider the vehicle's roll motion and its accelerations in the X, Y, and Z directions. Reliable detection of a vehicle rollover is possible on this basis, but the decision as to whether a rollover is present is not reliably made until a late point in time during the rollover. In certain instances of vehicle rollovers that are preceded by a dynamic driving maneuver, the occupant experiences large lateral accelerations. Such maneuvers can result, for example, in so-called soil-trip rollovers. In this regard, there is still potential for future occupant protection systems in terms of the triggering behavior.

Known methods are based, for example, on evaluation of a rotation rate sensor and two acceleration sensors that are integrated into a central airbag control unit. The rotation rate sensor ascertains the rotational velocity about the vehicle's longitudinal axis using the gyro principle, and the acceleration sensors additionally measure the vehicle acceleration in the transverse and vertical directions. The rotation rate is then evaluated in the main algorithm. On the one hand it is possible to detect the type of rollover using the measured values of the acceleration sensors, and on the other hand these values serve for plausibility testing. If the rotation rate algorithm detects a rollover, the safety devices are activated only if simultaneously enabled by the plausibility check.

In another known method, a timely triggering decision in the context of rollovers with a high lateral acceleration is made possible by the fact that a float angle and the lateral velocity of the vehicle are included. In one known method for expanded rollover detection, an estimate of the lateral velocity is carried out based on a yaw rate and the vehicle velocity in the longitudinal direction, taking into account the lateral acceleration; that estimate represents an indication of the vehicle's rollover probability in the context of a lateral drift into the median strip. The so-called float angle is likewise employed for determination of the lateral velocity.

It is not possible, however, to carry out a determination of the float angle over larger angle ranges and an estimate of the lateral velocity based on the ascertained float angle, as required for rollover detection, with known methods that are used, for example, in vehicle dynamics control systems, because they are suitable only for angle ranges below 10°. The reason for the narrow validity range is that a vehicle dynamics control system can no longer be successfully implemented at greater float angles.

A BRIEF SUMMARY OF THE INVENTION

The triggering method according to the present invention for activating a lateral velocity estimating system for occupant protection devices has the advantage that vehicle rollovers can already be detected at an early point in time. This ensures that safety devices such as a belt tensioner, head airbag, and roll bar can be activated in timely fashion, thus decreasing the risk of injury. Advantageously, the triggering method according to the present invention makes possible, by way of a road condition detection and an oversteer and understeer detection that are respectively performed with the aid of vehicle-dynamics variables, a reliable activation of the lateral velocity estimator for all road surfaces. This applies to road circumstances involving both low and high frictional coefficients. As a result, in the context of a vehicle breakaway on low-frictional-coefficient routes, a lateral velocity estimate is carried out and the lateral velocity can thus advantageously be utilized for the triggering strategy in the event of a subsequent accident, i.e., a lateral crash and/or a rollover event. The robustness of the algorithm is thus enhanced throughout the system, since the triggering method according to the present invention decreases the probability of improper triggering actions.

The information about a vehicle breakaway situation can moreover be made available to other restraint systems so that, for example in the context of a lateral motion of the vehicle and subsequent lateral crash, this information can be used in the triggering behavior of the lateral algorithm.

It is particularly advantageous that, during the oversteer and understeer detection procedure, a theoretical Ackermann yaw rate is calculated from a present steering angle, a present longitudinal velocity, and a predetermined vehicle wheelbase, which rate can be compared with a measured present yaw rate in order to detect an oversteer or understeer maneuver.

It is furthermore advantageous that during the oversteer and understeer detection procedure, a float angle change can be calculated from a lateral acceleration, a longitudinal velocity, and the present measured yaw rate. The risk of incorrect detections of oversteer or understeer maneuvers can thereby be reduced.

The float angle change is ascertained proceeding from a starting float angle that preferably is continuously determined by means of a long-term integration.

It is furthermore advantageous that, in order to generate an oversteer and understeer flag signal, during the oversteer and understeer detection procedure the Ackermann yaw rate, the float angle change, and the presently measured yaw rate are combined with one another and evaluated by a first logic circuit. The first logic circuit sets the oversteer and understeer flag signal if a vehicle oversteer or understeer is ascertained during the evaluation. The risk of improper detection of oversteer or understeer maneuvers can thereby be further reduced. In addition, the oversteer and understeer flag signal can be made available to other restraint systems.

The present yaw rate can be measured, for example, with a yaw rate sensor and/or with two linear acceleration sensors and/or with a sensor disposed at the center of gravity that measures a linear acceleration in at least two spatial axes.

It is furthermore advantageous that during the road condition detection procedure, a theoretical lateral acceleration is calculated from the presently measured yaw rate and the longitudinal velocity of the vehicle, which acceleration can be compared with the measured present yaw rate in order to detect a frictional coefficient of the road surface instantaneously being driven on.

In order to generate a low-µ flag signal during the road condition detection procedure, advantageously the theoretical lateral acceleration, the present measured lateral acceleration, and the oversteer and understeer flag are combined with one another and evaluated by a second logic circuit, with the result that vehicle operation on a low-frictional-coefficient route, a moderate-frictional-coefficient route, and/or a high-frictional-coefficient route can be detected.

The second logic circuit sets the low-μ flag signal, for example, when a low or moderate frictional coefficient for the road being driven on is ascertained in the context of the evaluation.

It is especially advantageous that for activation of the lateral velocity estimating system, the low-μ flag signal of the road condition detection procedure, the oversteer and understeer flag signal of the oversteer and understeer detection procedure, the presently measured yaw rate, the measured lateral acceleration, and the calculated float angle change are combined with one another and evaluated by a third logic circuit, the lateral velocity estimating system being activated if, in the evaluation, a breakaway situation in the context of a low and/or moderate frictional coefficient is ascertained. This can make possible an activation of the lateral velocity estimator even in the context of a breakaway even on a low-frictional-coefficient road surface.

DETAILED DESCRIPTION OF THE INVENTION

A known method for determining float angles that are greater than a value of 10°, and a lateral velocity derived from the float angles, is based on the assumption that the frictional coefficient of the road surface is high. Equation (1)

$$\beta \approx \omega_z - \frac{a_y}{v_x}, \text{ for small values of } \beta \qquad (1)$$

yields the float angle change, which represents an indicator of a breakaway situation. This equation is informative, however, only for sufficiently large lateral and yaw accelerations, so that the float angle change becomes relatively large as compared with non-hazardous driving situations. One disadvantage of the method may be seen in the fact that when the road surface is covered with ice and snow, very low road frictional coefficients can occur.

Figure 5:
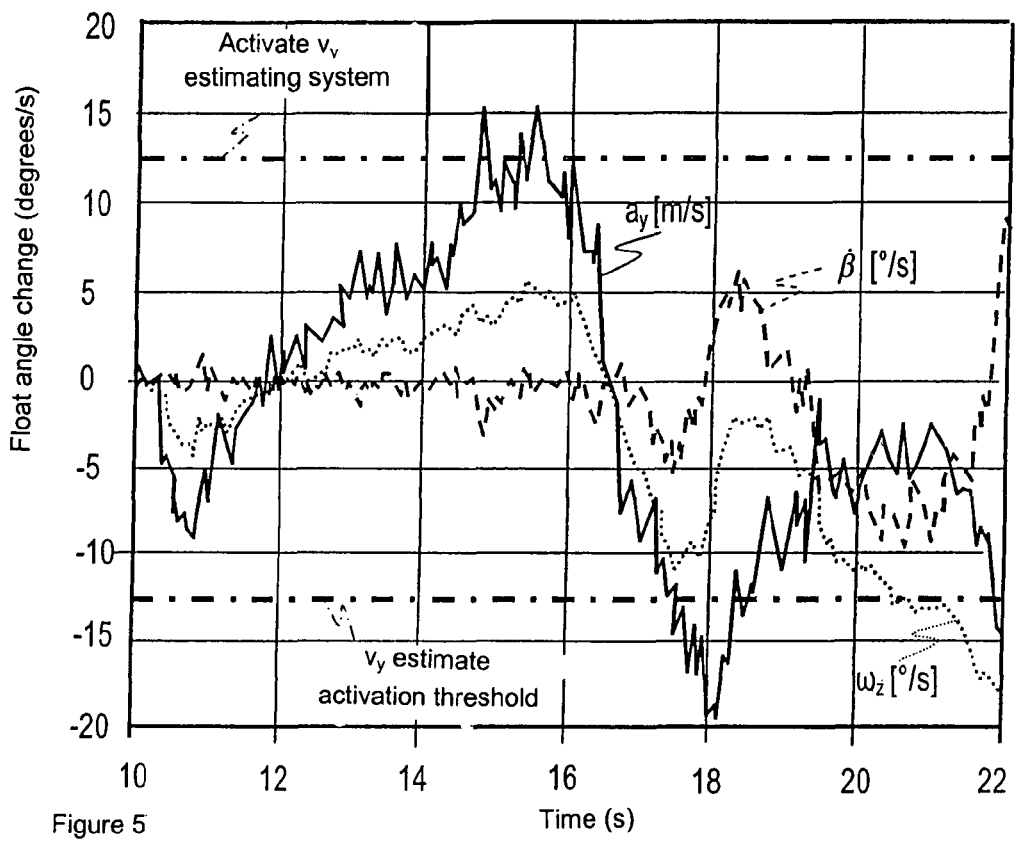
FIG. 5 shows schematic profiles for a lateral acceleration, a float angle change, and a yaw rate.
Figure 6:
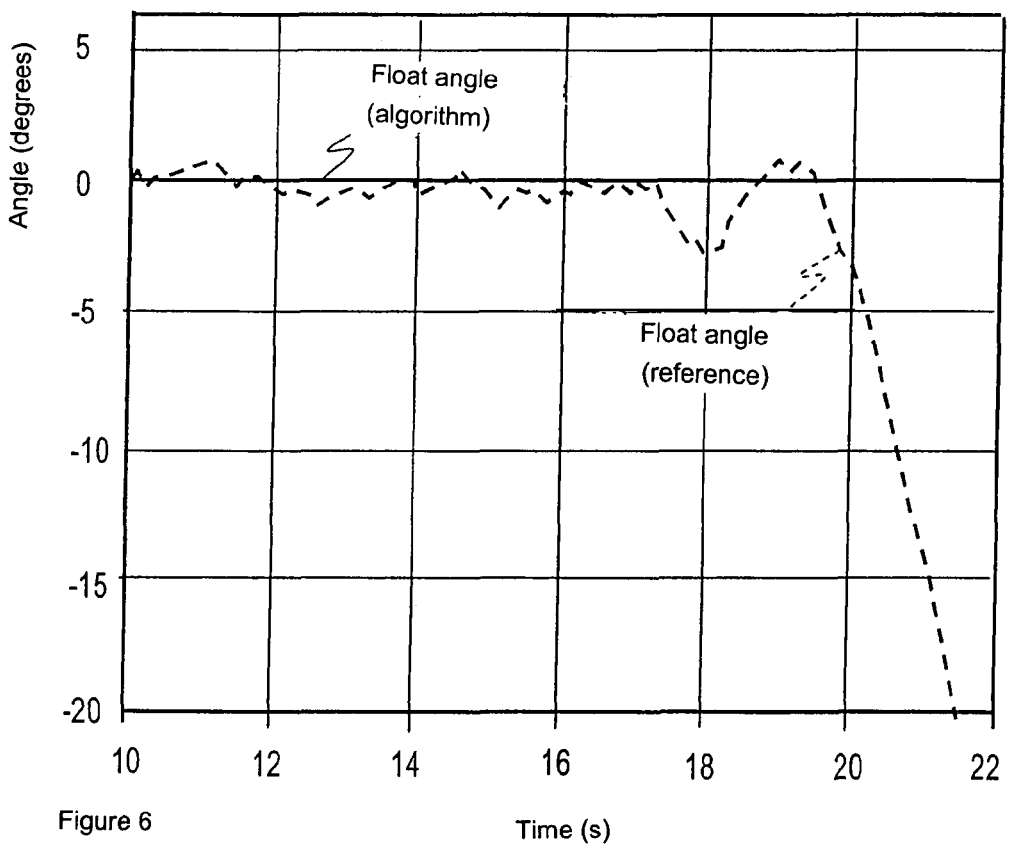
FIG. 6 shows schematic profiles for a float angle algorithm and a reference float angle.

Upon breakaway (skidding) of a vehicle on these substrate conditions, very low transverse accelerations and yaw rates occur because of the low frictional coefficient circumstances. FIG. 5 depicts the transverse accelerations and yaw rates in the context of a skid maneuver on ice. The dashed curve shows the calculated float angle change according to Equation 1. The dot-dash lines indicate lateral velocity estimator activation thresholds that must be exceeded by the float angle changes in order to cause an activation of the lateral velocity estimator. The activation thresholds are exceeded, however, only on a road having a high frictional coefficient. FIG. 6 shows the reaction of the aforementioned method. The reference float angle rises, and after a few seconds is already well above 10°. A vehicle dynamics control system has no control capability here, and a situation inevitably occurs in which the vehicle can, in a few seconds, build up a high lateral velocity. The output of the float angle estimator remains zero, however, since this situation is not sensed. The method cannot detect breakaway of the vehicle. A different setting for the activation thresholds, however, increases the lateral velocity estimator's susceptibility to improper activations, so that undesired activation of restraint means might occur.

The present invention therefore describes a triggering method for activation of a lateral velocity estimating system for occupant protection devices that, based on sensed vehicle-dynamics variables, carries out an oversteer and understeer detection procedure and a road condition detection procedure which are evaluated for activation of the lateral velocity estimating system.

Figure 1:
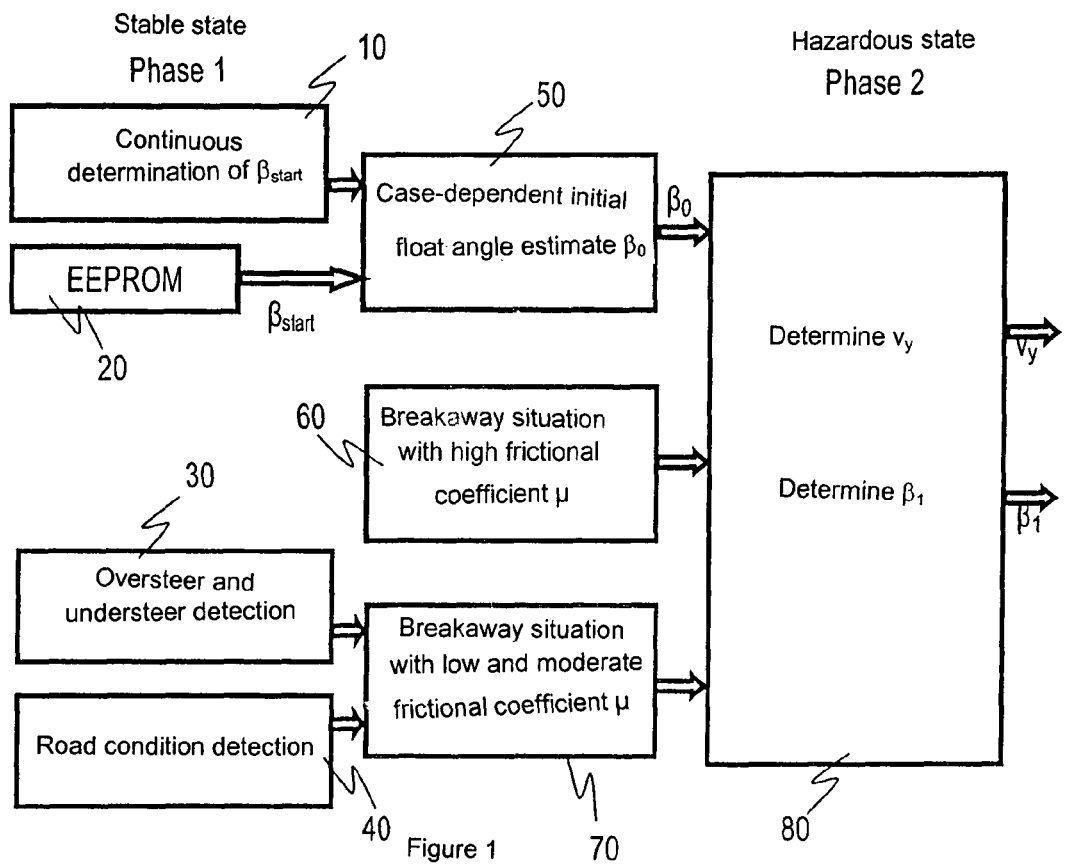
FIG. 1 is a schematic block diagram illustrating a method for lateral velocity estimation for occupant protection devices.

FIG. 1 is a schematic block diagram of a method for lateral velocity estimation for occupant protection devices. As is apparent from FIG. 1, an oversteer and understeer detection procedure 30 and a road condition detection procedure 40 are background processes during a Phase 1 of the method for lateral velocity estimation, i.e., during a stable vehicle state. Also during this Phase 1, vehicle-dependent values such as thresholds, wheelbase, starting float angle $\beta_{start}$, etc. are made available from a memory, for example an EEPROM. Starting float angle $\beta_{start}$ is determined continuously, proceeding from the stored value, by means of a long-term integration, and is made available to a case-dependent estimating system 50 for initial float angle $\beta_0$. In block 60, a breakaway situation when driving on roads having a high frictional coefficient μ is detected, for example by applying equation (1), and in block 70 a breakaway situation on roads having a low or moderate frictional coefficient μ is detected by applying the triggering method according to the present invention as a function of oversteer and understeer detection procedure 30 and road condition detection procedure 40. It is additionally apparent from FIG. 1 that during Phase 2, i.e., when a hazardous condition exists, the method for float angle determination and lateral velocity estimation is activated in block 80, the activation being triggered by the breakaway situation detected in block 60 or block 70.

Figure 2:
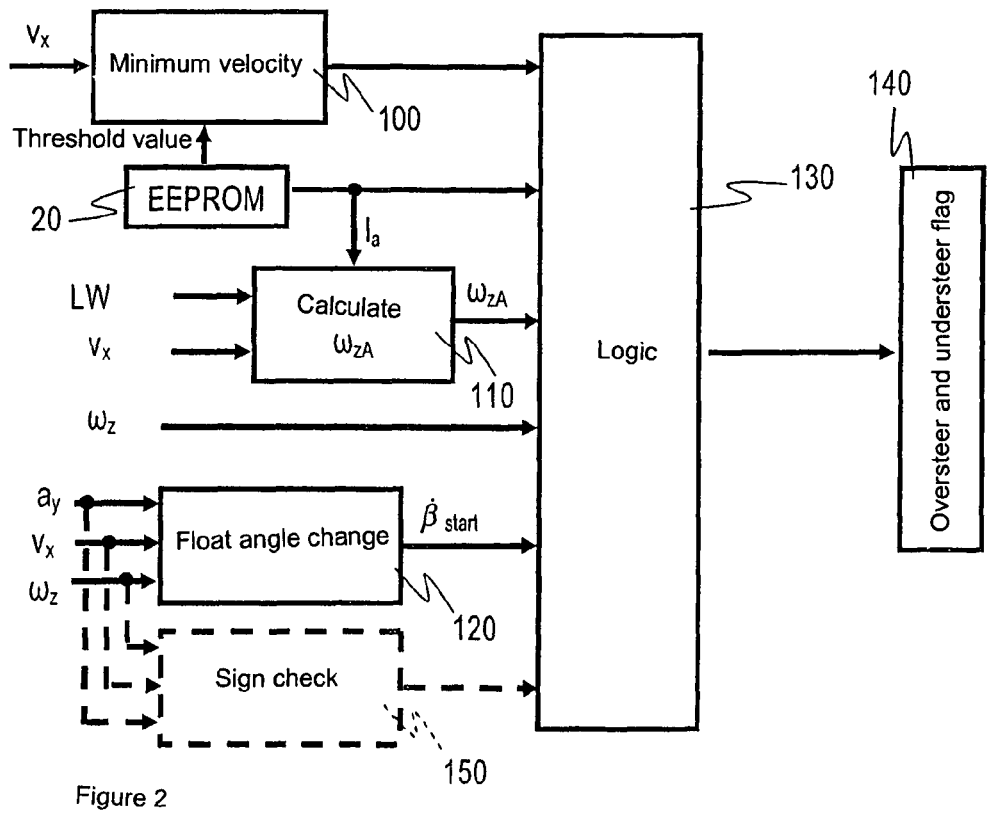
FIG. 2 is a schematic block diagram illustrating an oversteer and understeer detection procedure.

FIG. 2 is a schematic block diagram of oversteer and understeer detection procedure 30. The so-called Ackermann yaw rate $\omega_{zA}$, which is calculated in block 110 using equation (2) and is compared with a present yaw rate $\omega_z$, that is measured and made available by one or more sensors, is utilized for oversteer and understeer detection 30. Here LW designates the steering angle, which is provided by a vehicle dynamics system and/or a sensor, $v_x$ the vehicle's longitudinal velocity during normal vehicle operation, and $l_a$ the so-called wheelbase, which is a parameter provided in memory 20. The theoretical yaw rate of a vehicle in a steady-state skid is calculated using equation (2):

$$\omega_{zA} = \frac{LW * v_x}{l_a} \qquad (2)$$

In order then to detect an oversteer or understeer maneuver, in a first logic circuit 130 the theoretical calculated yaw rate $\omega_{zA}$ is compared with the measured present yaw rate $\omega_z$. The actual yaw rate $\omega_z$ can be made available by a sensor, e.g., a yaw rate sensor; by two linear acceleration sensors; or by a sensor, arranged at the center of gravity, that measures linear acceleration in at least two spatial axes, e.g., in the X and Y directions. It is furthermore possible for the present yaw rate $\omega_z$ to be made available, via a bus system, by another system, e.g., an ESP system.

For the comparison, the difference between the two magnitudes $\omega_{zA}$ and $\omega_z$ is calculated as described in equation (3) and the absolute value is determined, so that both an oversteer maneuver and an understeer maneuver are encompassed. The sign can be saved so that the situation can be used for subsequent analysis. This calculated variable is then compared with a threshold value that is made available by memory 20:

$$|\omega_{zA} - \omega_z| > \text{threshold value} \quad (3)$$

To prevent improper activation events, further conditions can also be stipulated. In block 150, for example, identity of sign between a lateral acceleration $a_y$ and the measured present yaw rate $\omega_z$ is checked. The dashed lines show that the check in block 150 is optional. In addition, a determination is made in block 120, from the measured lateral acceleration $a_y$, a present longitudinal velocity $v_x$, and the presently measured yaw rate $\omega_z$, of a float angle change $\beta$, which is compared in first logic circuit 130 with a threshold value made available by memory 20, the calculated float angle change $\beta$ being less than or equal to a threshold value in order to meet the criterion. In addition, the longitudinal velocity $v_x$ should exceed a minimum velocity predetermined by memory 20. To generate an oversteer and understeer flag signal 140 during oversteer and understeer detection procedure 30, the Ackermann yaw rate $\omega_{zA}$, float angle change $\beta$, and presently measured yaw rate $\omega_z$ are combined with one another and evaluated by first logic circuit 130; first logic circuit 130 sets oversteer and understeer flag signal 140 when a vehicle oversteer or understeer is ascertained in the evaluation, i.e., when a critical vehicle situation exists. This flag signal is then further evaluated in order to perform an activation of the lateral velocity estimator.

Figure 3:
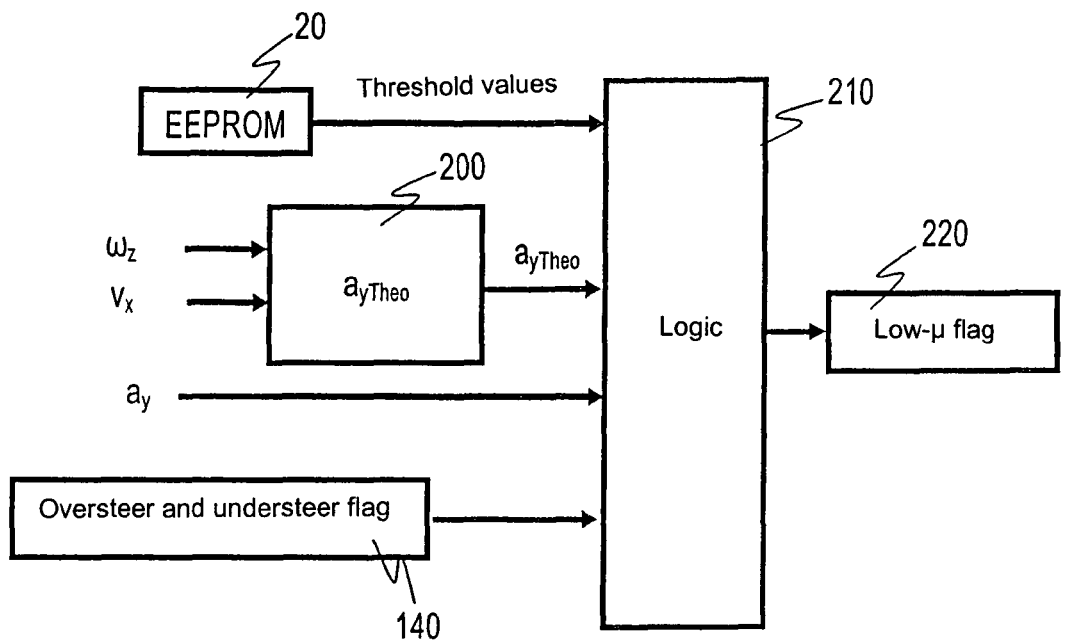
FIG. 3 is a schematic block diagram of a road condition detection procedure.

FIG. 3 is a schematic block diagram of road condition detection procedure 40. For road condition detection, or to detect whether the vehicle is being driven on snow or on a road having a low frictional coefficient, a theoretical lateral acceleration $a_{yTheo}$, which is calculated from the presently measured yaw rate $\omega_z$ and longitudinal velocity $v_x$, is utilized in addition to the information from oversteer and understeer detection system 30. To generate a low-μ flag signal 220 during road condition detection procedure 40, the theoretical lateral acceleration $a_{yTheo}$, presently measured lateral acceleration $a_y$, and oversteer and understeer flag 140 are combined with one another and evaluated by second logic circuit 210. Second logic circuit 210 sets low-μ flag signal 220 when a low or moderate frictional coefficient μ is ascertained, in the evaluation, for the road being traveled.

Second logic circuit 210 compares, for example, the theoretical lateral acceleration $a_{yTheo}$ with a measured present lateral acceleration $a_y$ in accordance with equation (4). If the absolute value of the difference deviates from a threshold value predetermined by memory 20, and if the measured present lateral acceleration $a_y$ is greater than a predetermined further threshold, in accordance with equation (5), then the vehicle is on a road surface having a high frictional coefficient:

$$|a_y - a_{yTheo}| > \text{threshold value} \quad (4)$$

and $$|a_y| > \text{threshold value} \quad (5)$$

If these conditions are not met, the vehicle is then being driven on a low-frictional-coefficient route. Second logic circuit 210 checks which condition lasts for a longer period of time during an associated oversteer and understeer situation, and as a function of the check sets low-μ flag signal 220, which indicates that the vehicle is traveling on a low-frictional-coefficient route. A breakaway situation is not yet thereby detected; a determination is merely made that the vehicle is traveling on a road surface having a low frictional coefficient.

Figure 4:
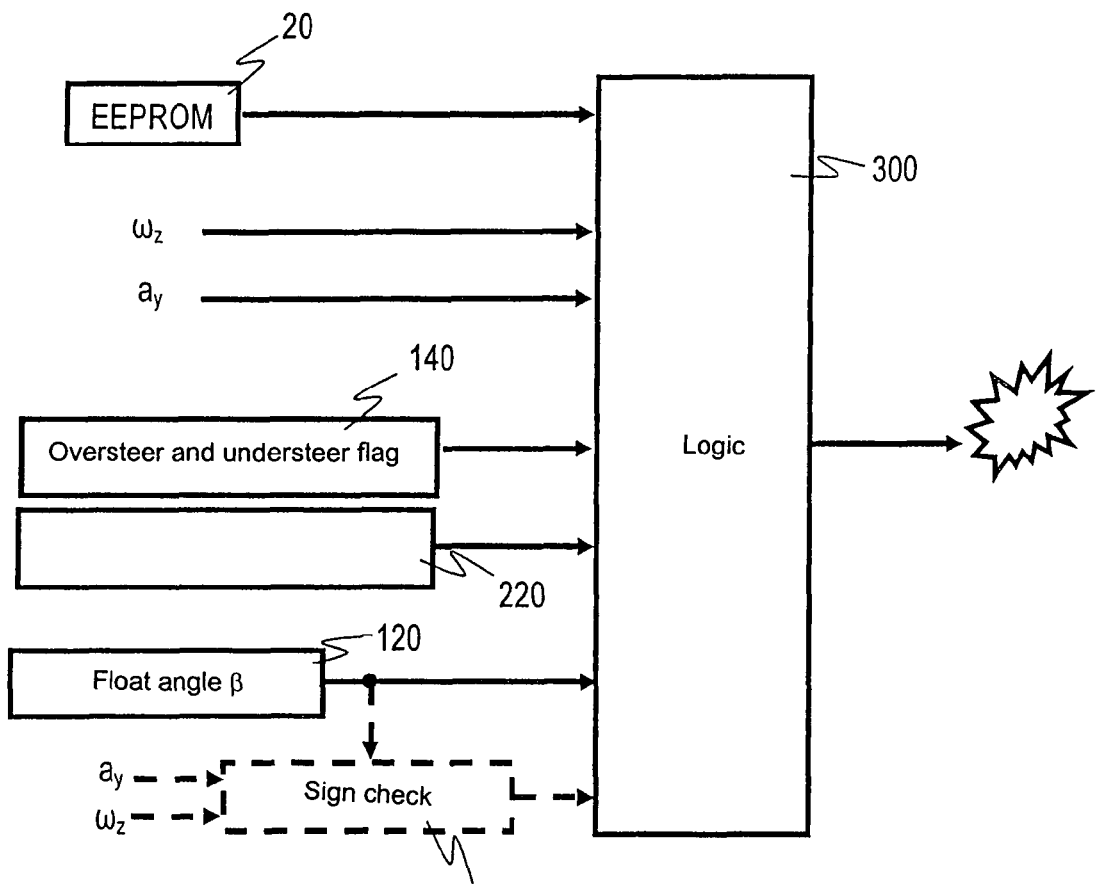
FIG. 4 is a schematic block diagram of a triggering method for activating a lateral velocity estimating system for occupant protection devices.

FIG. 4 is a schematic block diagram of a triggering method for activating a lateral velocity estimating system for occupant protection devices. First and second logic circuits 130 and 210 calculate the essential components for detection of a breakaway procession a low-frictional-coefficient road surface. As is apparent from FIG. 4, low-μ flag signal 220 of road condition detection procedure 40, oversteer and understeer flag signal 140 of oversteer and understeer detection procedure 30, the presently measured yaw rate $\omega_z$, measured lateral acceleration $a_y$, and calculated float angle change $\beta$ are combined with one another and evaluated by a third logic circuit 300 in order to activate lateral velocity estimating system 80, the lateral velocity estimating system being activated when a breakaway situation in the context of a low and/or moderate frictional coefficient is ascertained in the evaluation.

The measured present values, such as the yaw rate, vehicle velocity, etc., can be made available via a vehicle bus system from other vehicle systems, for example the ESP control unit.

What is claimed is:

1. A triggering method for activating a lateral velocity estimating system for a vehicle-occupant protection device of a vehicle, comprising:
   detecting a plurality of vehicle-dynamics variables;
   performing, based on the detected vehicle-dynamics variables, a) a first detection procedure for detecting one of an oversteer and understeer of a vehicle, and b) a second detection procedure for detecting, as a road condition for a road on which the vehicle is traveling, a frictional coefficient of the road's surface; and
   activating the lateral velocity estimating system depending on results of the first and second detection procedures.

2. The method as recited in claim 1, wherein during the first detection procedure, an Ackermann yaw rate is calculated based on a present steering angle, a present longitudinal velocity, and a predetermined vehicle wheelbase.

3. The method as recited in claim 2, wherein during the first detection procedure, a float angle change is calculated from a presently measured lateral acceleration, a present longitudinal velocity, and a presently measured yaw rate.

4. The method as recited in claim 3, wherein the presently measured yaw rate is measured with the aid of at least one of: a) a yaw rate sensor; b) a pair of linear acceleration sensors; and c) a sensor disposed at the center of gravity that measures a linear acceleration in at least two spatial axes.

5. The method as recited in claim 1, wherein the second detection procedure includes calculating a theoretical lateral acceleration as a function of a presently measured yaw rate and a longitudinal velocity of the vehicle.

6. The method as recited in claim 5, wherein the frictional coefficient is detected by comparing the theoretical lateral acceleration to a presently measured lateral acceleration.

7. The method as recited in claim 1, wherein the lateral velocity estimating system is activated in response to determining that the results of the first and the second detection procedures indicate a skidding situation involving one of a low and a moderate frictional coefficient.

8. A triggering method for activating a lateral velocity estimating system for a vehicle-occupant protection device of a vehicle, comprising:
- detecting a plurality of vehicle-dynamics variables;
- performing, based on the detected vehicle-dynamics variables, a) a first detection procedure for detecting one of an oversteer and understeer of a vehicle, and b) a second detection procedure for detecting a road condition for a road on which the vehicle is traveling; and
- activating the lateral velocity estimating system depending on results of the first and second detection procedures;

wherein:
during the first detection procedure:
- an Ackermann yaw rate is calculated based on a present steering angle, a present longitudinal velocity, and a predetermined vehicle wheelbase; and
- a float angle change is calculated from a presently measured lateral acceleration, a present longitudinal velocity, and a presently measured yaw rate; and
- the float angle change is ascertained based on a starting float angle which is continuously determined with the aid of a long-term integration.

9. A triggering method for activating a lateral velocity estimating system for a vehicle-occupant protection device of a vehicle, comprising:
- detecting a plurality of vehicle-dynamics variables;
- performing, based on the detected vehicle-dynamics variables, a) a first detection procedure for detecting one of an oversteer and understeer of a vehicle, and b) a second detection procedure for detecting a road condition for a road on which the vehicle is traveling, wherein during the first detection procedure:
  - an Ackermann yaw rate is calculated based on a present steering angle, a present longitudinal velocity, and a predetermined vehicle wheelbase; and
  - a float angle change is calculated from a presently measured lateral acceleration, a present longitudinal velocity, and a presently measured yaw rate;
- activating the lateral velocity estimating system depending on results of the first and second detection procedures; and
- generating a first flag signal for one of the oversteer and understeer, wherein the generation of the first flag signal includes:
  - combining, during the first detection procedure, the Ackermann yaw rate, the float angle change, and the presently measured yaw rate with one another;
  - evaluating the combined Ackermann yaw rate, the float angle change, and the presently measured yaw rate by a first logic circuit; and
  - setting the first flag signal by the first logic circuit if one of a vehicle oversteer and understeer is ascertained during the evaluation.

10. The method as recited in claim 9, wherein during the second detection procedure, a theoretical lateral acceleration is calculated from the presently measured yaw rate and the present longitudinal velocity.

11. The method as recited in claim 10, further comprising:
- generating a low-$\mu$ flag signal during the second detection procedure, wherein $\mu$ represents a frictional coefficient, and wherein the generating of the low-$\mu$ flag signal includes:
  - combining the theoretical lateral acceleration, the presently measured lateral acceleration, and the first flag signal; and
  - evaluating the combined theoretical lateral acceleration, presently measured lateral acceleration, and first flag signal by a second logic circuit.

12. The method as recited in claim 11, further comprising:
- setting, by the second logic circuit, the low-$\mu$ flag signal when one of a low and moderate value of $\mu$ for the road on which the vehicle is traveling is ascertained in the evaluation.

13. The method as recited in claim 11, further comprising:
- combining the low-$\mu$ flag signal, the first flag signal, the presently measured yaw rate, the presently measured lateral acceleration, and the calculated float angle change;
- evaluating the combined low-$\mu$ flag signal, first flag signal, presently measured yaw rate, presently measured lateral acceleration, and calculated float angle change, by a third logic circuit; and
- activating the lateral velocity estimating system if a skidding situation involving one of a low and a moderate frictional coefficient is ascertained in the evaluation.

14. A triggering method for activating a lateral velocity estimating system for a vehicle-occupant protection device of a vehicle, comprising:
- detecting a plurality of vehicle-dynamics variables;
- performing, based on the detected vehicle-dynamics variables, a) a first detection procedure for detecting one of an oversteer and understeer of a vehicle, and b) a second detection procedure for detecting a road condition for a road on which the vehicle is traveling, wherein a float angle change is ascertained during the first detection procedure from a starting float angle that is continuously determined through integration; and
- activating the lateral velocity estimating system depending on results of the first and second detection procedures.

15. The method as recited in claim 14, wherein the float angle change is calculated from a presently measured lateral acceleration, a present longitudinal velocity, and a presently measured yaw rate.

* * * * *